United States Patent [19]

Lipták et al.

[11] Patent Number: 5,099,159
[45] Date of Patent: Mar. 24, 1992

[54] HIGH-VOLTAGE INSULATING SYSTEM FOR ELECTRIC MACHINES

[75] Inventors: Gábor Lipták, Baden; Roland Schuler, Wettingen, both of Switzerland

[73] Assignee: Asea Brown Boveri Ltd., Baden, Switzerland

[21] Appl. No.: 424,692

[22] Filed: Oct. 20, 1989

[30] Foreign Application Priority Data

Nov. 10, 1988 [CH] Switzerland .................. 4168/88

[51] Int. Cl.$^5$ .................................... H02K 15/12
[52] U.S. Cl. ......................... 310/45; 310/179; 310/208; 310/215; 174/120 SR
[58] Field of Search ............... 310/215, 43, 45, 179, 310/208, 254, 214, 184, 213, 42, 200; 174/120 R, 120 SR; 29/596, 605; 428/324; 336/205

[56] References Cited

U.S. PATENT DOCUMENTS

| | | | |
|---|---|---|---|
| 2,417,746 | 3/1947 | Flecher | 310/215 |
| 3,069,302 | 12/1962 | Lewis | 174/120 R |
| 3,388,458 | 6/1968 | Logan | 29/596 |
| 3,662,199 | 5/1972 | Anderson et al. | |
| 3,974,314 | 8/1976 | Fuchs | 310/215 U X |
| 3,976,901 | 8/1976 | Liptak | 310/215 |
| 4,038,741 | 8/1977 | Schuler | 310/208 |
| 4,533,580 | 8/1985 | Otty | 310/45 |
| 4,634,911 | 1/1987 | Studniarz | 310/215 |
| 4,661,397 | 4/1987 | Kwiecinski | 310/215 |
| 4,806,806 | 2/1989 | Hjortsberg | 310/215 |

FOREIGN PATENT DOCUMENTS

| | | |
|---|---|---|
| 1488725 | 8/1969 | Fed. Rep. of Germany . |
| 2230110 | 12/1974 | France . |
| 342276 | 12/1959 | Switzerland . |
| 388403 | 6/1965 | Switzerland . |
| 559451 | 2/1975 | Switzerland . |
| 996901 | 6/1965 | United Kingdom . |

OTHER PUBLICATIONS

3rd International ASTA Symposium, May 5–7, 1987, Baden near Vienna, "Teilleiterisolation AUF Glimmerbasis Fur Hochspannungs-Maschinen" (MICA-Based Conductor Element Insulation for High-Voltage Machinery), R. Dommer, pp. 129–136.

Primary Examiner—R. Skudy
Attorney, Agent, or Firm—Oblon, Spivak, McClelland, Maier & Neustadt

[57] ABSTRACT

In an insulating system for high-voltage machines, a three-layer insulating tape is proposed as turn-to-turn insulation which comprises a center mica layer (1) which is covered on both sides by plastic foils (2,3) having different thickness. Thermoplastic adhesive layers (4,5) on the outer surfaces of the foils (2,3) produce an intimate bonding of the turn-to-turn insulation to the conductor elements and to the main insulation. An insulation of such construction is distinguished by a high electrical life at increased temperature and a high surge withstand capability.

5 Claims, 1 Drawing Sheet

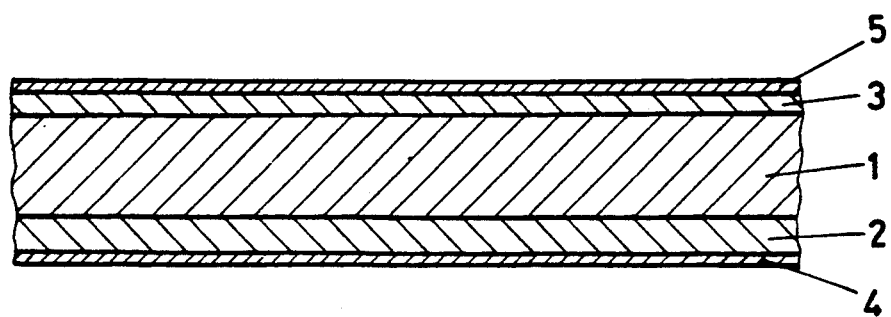
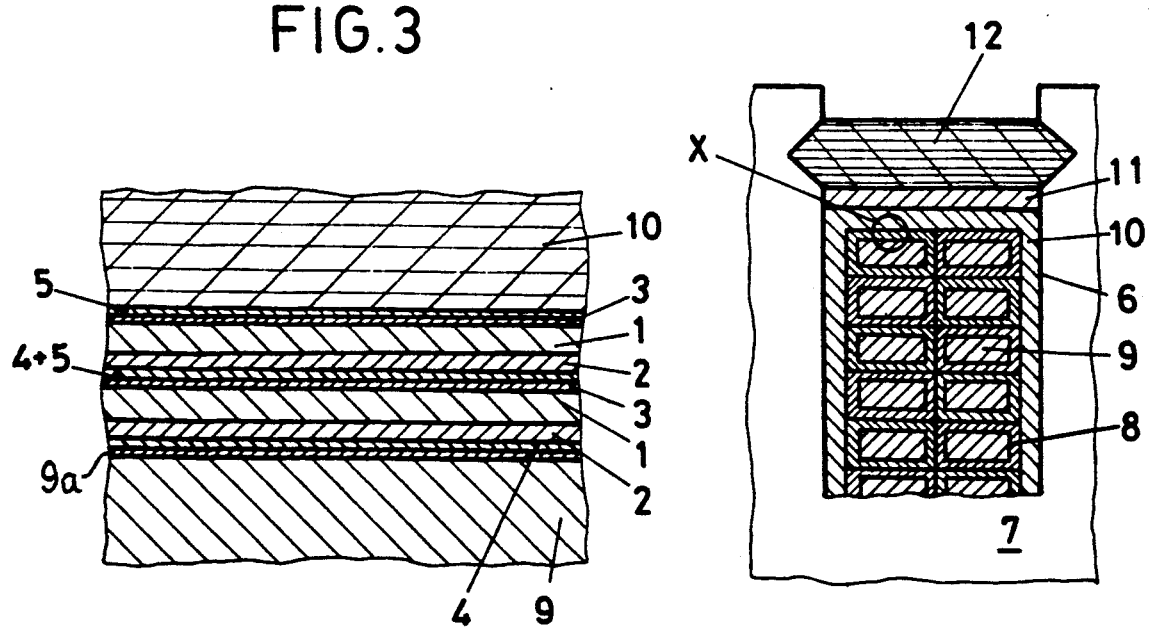

HIGH-VOLTAGE INSULATING SYSTEM FOR ELECTRIC MACHINES

BACKGROUND OF THE INVENTION

1. Field of the Invention

The invention relates to a high-voltage insulating system for electric machines, comprising a turn-to-turn insulation and a main insulation, in which turn-to-turn insulation an insulating tape, exhibiting at least three layers, is wound, onto a preferably enamel-insulated conductor element, around the conductor element and is bonded to the latter, which insulating tape comprises a center layer which essentially contains mica and which is covered on both sides by plastic foils, the conductor elements, combined into windings or rods, are surrounded by a main insulation and installed in the stator of the electric machine and are impregnated as a whole with impregnating resin which is subsequently cured in heat.

In this connection, the invention relates to a prior art obtained, for example, from Swiss Patent Specification 559 451.

2. Discussion of Background

For insulating the stator windings of rotating machines, particularly high-voltage motors, the post-impregnation technique has become highly successful in recent years. The winding elements for these machines are constructed as so-called integral coils for structural reasons. The winding insulation is extremely stressed, particularly in the case of abrupt voltage loading (switching and other overvoltages with short front duration), and represents the weakest part of the stator winding with respect to insulation. In the past, numerous faults which are attributable to a failure of the turn-to-turn insulation have been described in the literature. The insulation between adjacent electric turns (turn-toturn insulation) must meet several requirements in order to be able to ensure high operational reliability.

The requirements are set with respect to the various loads to which the turn-to-turn insulation is already abruptly subjected during the processing of the insulating material which is in most cases tape-shaped (winding the tape around the winding wire, section wire), shaping the coils (that is to say bending on edge and on the flat) and during the further production phases (for example impregnation, curing), various tests and then continuously or repetitively in operation.

In consequence, a tape used for insulating the turns must exhibit high flexibility and, at the same time, high mechanical load carrying capability. Previous solutions were lacking in this respect since these in some cases contradictory requirements could only be partially met. The good characteristics of the mica layer such as, for example, its electrical barrier effect, was in some cases distinctly reduced due to mechanical stresses.

Furthermore, the turn-to-turn insulation must exhibit high corona resistance at increased (operating) temperature. According to information in the literature, the dielectric long-term behavior of previous solutions has been found to be inadequate in many cases.

A sufficiently high surge withstand capability (also of the aged turn-to-turn insulation) is very essential. The latest IEC recommendations prescribe a minimum surge withstand capability of 0.5 (4 $U_N$+1) kV (crest value), where $U_N$=rated voltage in kV$_{rms}$, per coil. For a machine with $U_N$=15 kV, this means a turn-to-turn insulation having a surge withstand capability of more than 30.5 kV.

In addition, the components of the turn-to-turn insulation must be chemically resistant to the impregnating resins/enamels. Furthermore, good bonding of the turn-to-turn insulation both to the (enameled) winding wire and to the so-called main insulation of the coils (that is to say insulation with respect to earthed iron) is required in order to achieve an overall homogeneous structure of the main/turn-to-turn insulation.

It is also of economic significance that the turn-to-turn insulation needs space of as small a volume as possible (in comparison with the "active material" such as copper wire) and it can be inexpensively produced and applied.

The turn-to-turn insulation according to Swiss Patent Specification 559 451 consists of four layers: a mica layer of about 100 µm, a thin glass fabric (as support for the mica layer) and cover layers on both sides, having a thickness of about 8-10 µm of polycarbonate foil. The center layer of the insulating tape, which consists of glass fabric and mica, is bonded to the two cover foils by means of a solventless bonding agent, preferably epoxy resin in the B state. After the conductor element insulation has been applied and the insulated conductors have been formed into coils, excess resin emerges at the points of overlap of the tape during the pressure and heat treatment and bonds the insulating tape to the single conductors and the single conductors to one another. After the curing of the resin, the conductor bundle, which is pre-strengthened in this manner, is provided with the (dry) main insulation and this is then further treated in the so-called post-impregnation process.

This known method has been most successful in the past but required a comparatively time-consuming intermediate step which could not be omitted. Without it, there is no guarantee that the resin also emerges to the desired and necessary extent from the said mica/glass fabric layer at the points of overlap of the insulating tape. In addition, the resin system of the main insulation had to be accurately matched to the cover foils in order to ensure perfect bonding without cavities between the conductor element insulation and main insulation.

For this reason, later proposals for insulating tapes for turn-to-turn insulation, for example in accordance with the conference report "Teilleiterisolation auf Glimmerbasis for Hochspannungsmaschinen" (mica-based conductor element insulation for high-voltage machines), distributed at the 3rd International ASTA Symposium, May 5-7, 1987 in Baden near Vienna, have omitted one of the two cover foils, extremely thin cover foils being used in the case of multi-layer insulating tapes.

However, the bonding problem demonstrated above is only partially solved by means of these known insulating tapes.

SUMMARY OF THE INVENTION

Accordingly, one object of this invention is to provide a novel method for producing turn-to-turn insulation which provides the possibility of high-quality turn-to-turn insulation with little space requirement. It is also an object of the invention to specify an insulating tape for carrying out the method.

The high-voltage insulating system according to the invention is characterized by the fact that an insulating tape, at least one outer surface of which is provided with a bonding agent which at least causes the insulating tape to be bonded to the conductor elements during the heat treatment, is wound around the conductors (enamel-insulated or bare copper wires).

In this arrangement, on the one hand, insulating tapes can be used which are provided right from the start with a thermoplastic adhesive, preferably phenoxy resins in the B state, and on the other hand, the thermoplastic adhesive can also be applied immediately before the winding.

It must be emphasized in this connection that now bare conductors can also be reliably insulated.

To carry out the method in accordance with the first alternative, an insulating tape is used, in accordance with the invention, which comprises a mica layer which is impregnated with bonding agent and which layer is covered on both sides by plastic foils having different thicknesses and the outer surfaces of which are coated with a thermoplastic adhesive, in which arrangement the thinner one of the two foils comes to be located on the outside when they are wound around the conductor elements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein FIG. 1 shows a longitudinal section through an insulating tape for the turn-to-turn insulation of conductor elements;

FIG. 2 shows a cross section through the stator winding of an electric machine;

FIG. 3 shows an enlarged representation of detail X from FIG. 2.

DESCRIPTION OF THE PREFERRED EMBODIMENTS

Referring now to the drawings, wherein like reference numerals designate identical or corresponding parts throughout the several views, in the longitudinal section through an insulating tape according to FIG. 1, a mica layer of approximately 40μm thickness which is impregnated with a bonding agent, for example modified epoxy resin in the B state, designated by 1, is covered on both sides by plastic foils 2,3 of different thickness. Both plastic foils 2,3 consist of modified PETP or polyimide; foil 2 is thicker by a factor of 1.5 to 3 times than the other foil 3. In this arrangement, foil 2 essentially determines the mechanical characteristics (breaking strength) which are important for the processing of the insulating tape, and (lacuna) carrier of the sensitive mica tape whilst the thin cover foil virtually only performs protective functions and can be more easily stretched due to its lack of thickness. The outer surfaces of the foils 2 and 3 are respectively coated with thermoplastic adhesive layers 4,5. The thickness of each layer of thermoplastic adhesive is typically 5 μm. As a rule, it consists of a phenoxy resin in the B state.

The construction of the insulating system according to the invention is roughly conveyed by FIG. 2 and in detail by FIG. 3. One of a plurality of conductor elements 9 insulated with respect to one another by means of a turn-to-turn insulation 8 is arranged in a slot 6 in the stator stack of laminations 7 of the electric machine. The conductor element bundle is surrounded by a main insulation 10. The bundle is fixed in location by means of a slot wedge 12 with interposition of a shim 11.

FIG. 3 illustrates detail X from FIG. 2 on a greatly enlarged scale; the two sheet construction of the turn-to-turn insulation can be seen clearly in the case of the example as well as the thermoplastic adhesive layer 4, which are fused to form a single layer 4+5.

The foils 2 facing the conductor element 9, which is provided with an enamel insulation 9a, is thicker by a factor of 1.5 to 3 times than the other foil 3.

The method for producing windings, the sequence of which is illustrated in FIG. 2, progresses in the following method steps. The A. Winding an insulating tape as shown in FIG. 1 around the enamel, B. insulated conductor elements 9, form coils or half coils, C. Applying the main insulation, D. Inserting the coils or half coils into the slots (of the stator), E. Producing the switching connections in the end winding, F. Post - impregnating the completely wound stator body in the impregnating tank, Heat treating the impregnated stator in a drying oven.

In this connection, the processes occurring in stages F and G are of essential significance to the invention and decisively influence the quality of the overall insulation:

The thermoplastic adhesive layer 4 located between the foil 2 and the enamel insulation 9a of the conductor elements fused during the heat treatment and bonds the foil 2 to the conductor element without requiring a "resin reserve" from the mica layer 1. In addition, unavoidable cavities are also filled out during the overlapping or abutting winding due to capillary effect. The other thermoplastic adhesive layer 5, is used, on the one hand, for bonding layers of insulating tape which are located above one another to one another and, on the other hand, as adhesive agent between the outer layer of insulating tape and the main insulation. Instead of an insulating tape which has already been provided with thermoplastic adhesive layers 4,5, by the manufacturer for example, these adhesive can be applied only shortly before the tape is wound around the conductor elements, care having to be taken that the thermoplastic adhesive has dried well at the time of winding in order to simplify the handling of the insulated conductors.

The insulating tape according to the invention provides a thermally and dielectrically high-quality turn-to-turn insulation compared with conventional solutions, with reduced space requirement and lower costs and very good processability. The advantages result from the special construction for the tape combination (mica layer and carrier or sliding tapes), in which connection especially the two plastic films of different thickness and the combination with thermoplastic adhesive applied on the outside must be emphasized.

Extensive tests have shown that the "electrical" life at increased temperature (140° C.) is longer by a factor of 5...8 times than with conventional solutions and the surge withstand capability (measured on finished coils) is approximately three times higher. Motor windings provided with the turn-to-turn insulation described do not therefore need to be automatically provided with an overvoltage.

Preferably, the thicker plastic foil has a thickness of about 18 to 50 μ and the thinner plastic foil has a thickness of about 10 to 30 μm. Additionally the center layer preferably has a thickness of between about 40 and 60 μm. Also, the thermoplastic adhesive layer has a thickness of between 3 and 8 μm.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. High-voltage insulating system for an electric machine comprising:
    a turn-to-turn insulation; and
    a main insulation;
    wherein the turn-to-turn insulation is an insulating tape, having at least three layers, which is wound onto and around a conductor wire and bonded thereto;
    wherein the insulating tape comprises a center layer which consists essentially of mica;
    wherein plastic foils cover both sides of the center layer;
    wherein a plurality of conductor wires having the insulating tape applied thereto are: combined to form one of a winding and a coil surrounded by the main insulation, installed into a stator of the electric machine, and impregnated as a whole with an impregnating resin which is subsequently cured;
    wherein the insulating tape is provided with a bonding agent which at least causes adjacent conductor wires of the plurality of conductor wires to be bonded together during a heat treatment;
    wherein the plastic foils covering the center layer of the insulating tape respectively comprise a thicker plastic foil and a thinner plastic foil, the thicker plastic foil being positioned to face the associated conductor wire; and
    wherein the thicker plastic foil is thicker by a factor of 1.5 to 3 than the thinner plastic foil.

2. High-voltage insulating system according to claim 1, wherein the conductor wire to which the insulating tape is applied has an enamel insulation.

3. High-voltage insulating system for an electric machine comprising:
    a turn-to-turn insulation;
    and a main insulation;
    wherein the turn-to-turn insulation is an insulating tape, having at least three layers, which is wound onto and around a conductor wire and bonded thereto;
    wherein the insulating tape comprises a center layer which consists essentially of mica;
    wherein plastic foils cover both sides of the center layer;
    wherein a plurality of conductor wires having the insulating tape applied thereto are: combined to form one of a winding and a coil surrounded by the main insulation, installed into a stator of the electric machine, and impregnated as a whole with an impregnating resin which is subsequently cured;
    wherein the insulating tape is provided with a bonding agent which at least causes adjacent conductor wires of the plurality of conductor wires to be bonded together during a heat treatment;
    wherein the plastic foils covering the center layer of the insulating tape respectively comprise a thicker plastic foil and a thinner plastic foil, the thicker plastic foil being positioned to face the associated conductor wire; and
    wherein the plastic foils comprise one of polyester- and polyamide-based foils, wherein the thicker plastic foil has a thickness of about 18 to 50 μ and the thinner foil has a thickness of about 10 to 30 μm.

4. High-voltage insulating system for an electric machine comprising:
    a turn-to-turn insulation; and
    a main insulation;
    wherein he turn-to-turn insulation is an insulating tape, having at least three layers, which is wound onto and around a conductor wire and bonded thereto;
    wherein the insulating tape comprises a center layer which consists essentially of mica;
    wherein plastic foils cover both sides of the center layer;
    wherein a plurality of conductor wires having the insulating tape applied thereto are: combined to form one of a winding and a coil surrounded by the main insulation, installed into a stator of the electric machine, and impregnated as a whole with an impregnating resin which is subsequently cured;
    wherein the insulating tape is provided with a bonding agent which at least causes adjacent conductor wires of the plurality of conductor wires to be bonded together during a heat treatment; and
    wherein the center layer comprises one of a mica layer and a mica tape and wherein the center layer has a thickness of between about 40 and 60 μm.

5. High-voltage insulating system for an electric machine comprising:
    a turn-to-turn insulation; and
    a main insulation;
    wherein the turn-to-turn insulation is an insulating tape, having at least three layers, which is wound onto and around a conductor wire and bonded thereto;
    wherein the insulating tape comprises a center layer which consists essentially of mica;
    wherein plastic foils cover both sides of the center layer;
    wherein a plurality of conductor wires having the insulating tape applied thereto are: combined to form one of a winding and a coil surrounded by the main insulation, installed into a stator of the electric machine, and impregnated as a whole with an impregnating resin which is subsequently cured;
    wherein the insulating tape is provided with a bonding agent which at least causes adjacent conductor wires of the plurality of conductor wires to be bonded together during a heat treatment;
    wherein the bonding agent is an adhesive layer consisting of a thermoplastic adhesive; and
    wherein the thermoplastic adhesive is a solventless impregnation resin in a B state having a thickness of between 3 and 8 μm.

* * * * *